United States Patent [19]
Wicki et al.

[11] Patent Number: 5,959,995
[45] Date of Patent: Sep. 28, 1999

[54] ASYNCHRONOUS PACKET SWITCHING

[75] Inventors: Thomas M. Wicki, Palo Alto, Calif.;
Patrick J. Helland, Redmond, Wash.;
Takeshi Shimizu, San Jose, Calif.;
Wolf-Dietrich Weber, La Honda, Calif.; Winfried W. Wilcke, San Jose, Calif.

[73] Assignee: Fujitsu, Ltd., Japan

[21] Appl. No.: 08/605,677

[22] Filed: Feb. 22, 1996

[51] Int. Cl.⁶ .................................................... H04J 3/24
[52] U.S. Cl. ........................................ 370/400; 370/351
[58] Field of Search ................................ 370/355, 388,
370/389, 392, 397, 400, 410, 411, 413,
422, 401, 406, 407, 408, 409, 412, 428,
394, 395, 351, 352, 229, 231, 237, 238,
256; 340/825.05, 825.5, 826

[56] References Cited

U.S. PATENT DOCUMENTS

| | | | |
|---|---|---|---|
| 4,058,838 | 11/1977 | Crager et al. | 358/257 |
| 5,115,433 | 5/1992 | Baran et al. | 370/94.3 |
| 5,351,237 | 9/1994 | Shinobara et al. | 370/58.3 |
| 5,524,116 | 6/1996 | Kalmanek et al. | 370/389 |
| 5,544,161 | 8/1996 | Bigham et al. | 370/58.1 |
| 5,590,122 | 12/1996 | Sandorfi et al. | 370/60 |

FOREIGN PATENT DOCUMENTS

| | | | |
|---|---|---|---|
| 0 282 198 A2 | 9/1988 | European Pat. Off. | H04L 11/20 |
| 0 602 693 A2 | 6/1994 | European Pat. Off. | H04L 12/56 |
| 0 658 028 A2 | 6/1995 | European Pat. Off. | H04L 29/06 |

*Primary Examiner*—Dang Ton
*Attorney, Agent, or Firm*—Fenwick & West LLP

[57] ABSTRACT

A multiprocessor system includes a plurality of nodes and an interconnect that includes routers. Each node includes a reliable packet mover and a fast frame mover. The reliable packet mover provides packets to the fast frame mover which adds routing information to the packet to form a frame. The route to each node is predetermined. The frame is provided to the routers which delete the route from the routing information. If the frame is lost while being routed, the router discards the frame. If the packet is received at a destination node, the reliable packet mover in that node sends an acknowledgment to the source node if the packet passes an error detection test. The reliable packet mover in the source node resends the packet if it does not receive an acknowledgment in a predetermined time. The fast frame mover randomly selects the route from a plurality of predetermined routes to the destination node according to a probability distribution.

12 Claims, 11 Drawing Sheets

ASYNCHRONOUS PACKET SWITCHING

CROSS-REFERENCES TO RELATED APPLICATIONS

The subject matter of this application is related to the subject matter of the following applications:

application Ser. No. 08/605,676, entitled "SYSTEM AND METHOD FOR DYNAMIC NETWORK TOPOLOGY EXPLORATION" filed on Feb. 22, 1996, by Thomas M. Wicki, Patrick J. Helland, Wolf-Dietrich Weber, and Winfried W. Wilcke now U.S. Pat. No. 5,740,346;

application Ser. No. 08/603,926, entitled "LOW LATENCY, HIGH CLOCK FREQUENCY PLESIO-ASYNCHRONOUS PACKET-BASED CROSSBAR SWITCHING CHIP SYSTEM AND METHOD" filed on Feb. 22, 1996, by Thomas M. Wicki, Jeffrey D. Larson, Albert Mu, and Raghu Sastry now U.S. Pat. No. 5,838,684;

application Ser. No. 08/603,880, entitled "METHOD AND APPARATUS FOR COORDINATING ACCESS TO AN OUTPUT OF A ROUTING DEVICE IN A PACKET SWITCHING NETWORK" filed on Feb. 22, 1996, by Jeffrey D. Larson, Albert Mu, and Thomas M. Wicki now U.S. Pat. No. 5,892,766;

application Ser. No. 08/604,920, entitled "CROSSBAR SWITCH AND METHOD WITH REDUCED VOLTAGE SWING AND NO INTERNAL BLOCKING DATA PATH" filed on Feb. 22, 1996, by Albert Mu and Jeffrey D. Larson;

application Ser. No. 08/603,913, entitled "A FLOW CONTROL PROTOCOL SYSTEM AND METHOD" filed on Feb. 22, 1996, by Thomas M. Wicki, Patrick J. Helland, Jeffrey D. Larson, Albert Mu, Raghu Sastry, and Richard L. Schober, Jr.;

application Ser. No. 08/603,911, entitled "INTERCONNECT FAULT DETECTION AND LOCALIZATION METHOD AND APPARATUS" filed on Feb. 22, 1996, by Raghu Sastry, Jeffrey D. Larson, Albert Mu, John R. Slice, Richard L. Schober, Jr., and Thomas M. Wicki now U.S. Pat. No. 5,768,300;

application Ser. No. 08/603,923, entitled, "METHOD AND APPARATUS FOR DETECTION OF ERRORS IN MULTIPLE-WORD COMMUNICATIONS" filed on Feb. 22, 1996, by Thomas M. Wicki, Patrick J. Helland, and Takeshi Shimizu;

U.S. Pat. No. 5,615,161, entitled "CLOCKED SENSE AMPLIFIER WITH POSITIVE SOURCE FEEDBACK" issued on Mar. 25, 1996, by Albert Mu;

all of the above applications are incorporated herein by reference in their entirety.

FIELD OF THE INVENTION

The invention relates to data transmission on a network, and more particularly to asynchronous packet switching data transmission in a multiprocessor environment.

BACKGROUND OF THE INVENTION

A multiprocessor system includes several processors connected to one or more memories. The interconnect can take one of several forms, for example a shared bus, a cross-bar, or the like. The interconnect must support fast access (low latency) and high bandwidth. Existing interconnects suffer either from limited bandwidth (as in shared bus interconnects), scalability problems (as in cross-bar interconnects), or excessive latency (as in general networks).

It is desirable to have a multiprocessor system that allows low latency and high bandwidth access to all of memory. In addition the available bandwidth should increase (scale) when additional processors/memories are added.

SUMMARY OF THE INVENTION

In the present invention, a multi-node system comprises a plurality of nodes coupled to each other. The nodes communicate with one another by point to point packets. Each node includes a packet mover and a frame mover. The packet mover provides a packet to the frame mover, provides an acknowledgment in response to receiving a packet from one of the other packet movers, and resends the packet to the frame mover if an acknowledgment is not received from one of the other packet movers in a predetermined amount of time. Each packet indicates a destination node. The frame mover converts the packet into a frame, generates a route to the destination node. The frame is defective, it is discarded and the packet mover eventually retransmits the packet. The frame mover provides source routing and multiple routes to nodes. The interconnect may be of a flexible topology. Packets have a bounded finite life.

The frame mover selects a preselected route to a destination node, generates a frame that includes said preselected route, and provides the frame to the plurality of routers for communication to the destination node. The route includes a sequence of route steps through some of the plurality of routers for communicating the frame therebetween. The frame mover includes a routing table for storing a plurality of preselected routes to the destination node and includes a controller for selecting one of the plurality of preselected routes for inclusion in the frame.

DETAILED DESCRIPTION OF THE PREFERRED EMBODIMENTS

A preferred embodiment of the present invention is now described with reference to the Figures where like reference numbers indicate identical or functionally similar elements. Also the digits that are not the two least significant digits of each reference number corresponds to the figure in which the reference number is first used.

Figure 1:
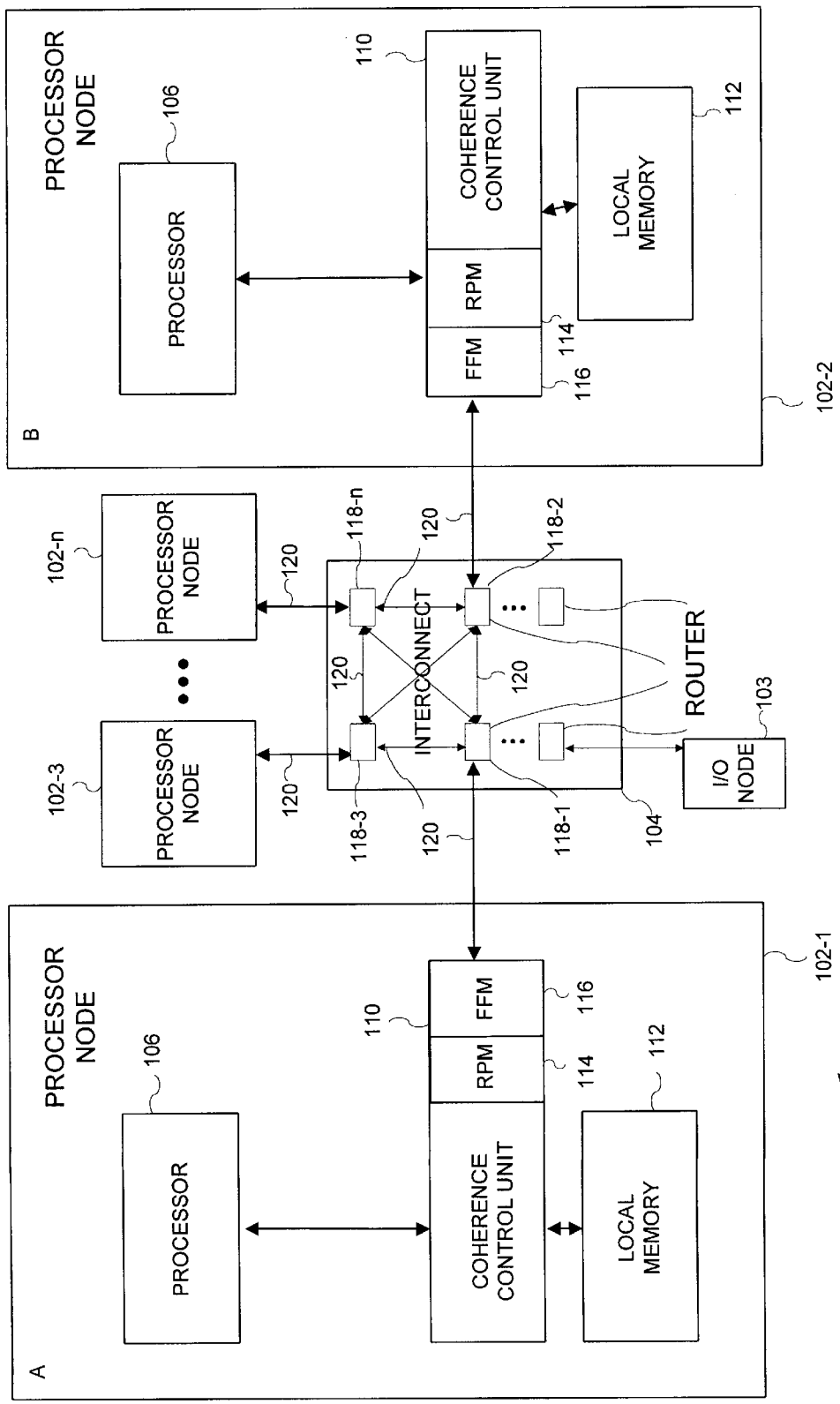
FIG. 1 is a block diagram illustrating a multi-processor system in accordance with the present invention.

Referring to FIG. 1, there is shown a block diagram illustrating a multiprocessor system 100 in accordance with the present invention. The multiprocessor system 100 includes a plurality of processor nodes 102 each coupled by a mesh link 120 to an interconnect 104. Each processor node 102 includes a processor 106, a coherence control unit 110, and a local memory 112. The coherence control unit 110 includes a reliable packet mover (RPM) 114 and a fast frame mover (FFM) 116.

The reliable packet mover 114 provides reliable end to end data communication between processor nodes 102. The fast frame mover 116 routes data from a source processor node 102 to a destination processor node 102. For each processor node 102, at least one route to every destination processor node 102 is stored in the fast frame mover 116. A method for determining the topology of the interconnect 104 and areas of failure therein is described in U.S. patent application Ser. No. 08/605,676 entitled "SYSTEM AND METHOD FOR DYNAMIC NETWORK TOPOLOGY EXPLORATION" filed Feb. 22, 1996, by Thomas M. Wicki, Patrick J. Helland, Wolf-Dietrich Weber, and Winfried W. Wilcke now U.S. Pat. No. 5,740,346, the subject matter of which is incorporated herein by reference.

Other architectures of the processor node 102 may be used. For example, the coherence control unit 110 may be coupled to a cache memory, which is coupled to the processor 106.

The interconnect 104 includes a plurality of routers 118 interconnected by mesh links 120. The plurality of processor nodes 102 are coupled to the routers 118 by mesh links 120. More than one processor node 102 may be coupled to the same router 118. The routers 118 preferably are cross bar switches. In the specific implementation described herein for illustrative purposes, the routers 118 have 6 ports. Of course, in a system with a few processor nodes 102, the interconnect 104 may include only one router 118, and in a system including two processor nodes 102, no router 118 need be included. An example of a router is described in U.S. patent application Ser. No. 08/603,926, entitled "LOW LATENCY, HIGH CLOCK FREQUENCY PLESIOSYNCHRONOUS PACKET-BASED CROSSBAR SWITCHING CHIP SYSTEM AND METHOD", filed Feb. 22,1996, by Thomas M. Wicki, Jeffrey D. Larson, Albert Mu, and Raghu Sastry now U.S. Pat. No. 5,838,684, the subject matter of which is incorporated herein by reference.

The interconnect 104 uses a packet based protocol in which all communication is directly processor node 102 to processor node 102. The interconnect 104 need not provide multicast or broadcast. All data transferred is parcelled into packets, which are described below in conjunction with FIG. 3.

The multi-processor system 100 is a shared memory system that provides nonuniform memory access times. The processor 106 may access other local memory 112. The access to the local memory 112 of a first processor node 102 is less than the access time to the memory of another processor node 102. By writing software that allows a processor 106 to make higher use of the local memory 112, the latency is reduced. The latency of the network is a measurement of the time required to provide a requesting processor node 102 with the requested data as measured from the time at which the memory request is transmitted. In other words, latency indicates how long it takes before you receive the data after it is requested.

The bandwidth of the link between the coherence control unit 110 and the local memory 112 preferably is substantially equal to the bandwidth of the link between the coherence control unit 110 and the interconnect 104. Bandwidth depends both on the rate at which you can receive or provide data and on the width of the path.

The multiprocessor system 100 preferably is a distributed memory system. More specifically, the system 100 has a memory architecture that is physically distributed but the local memories 112 are logically shared. For example, a processor node 102, e.g. node A, may request access to a memory location that this node 102 processes as being local but in fact it is actually physically located in a different local memory 112 that is coupled to a different processor node 102, e.g. node B. The coherence control unit 110 of the requesting node or source node (node A) identifies the location of the memory and the data stored at that location is quickly retrieved.

The multiprocessor system 100 may also include input/output (I/O) nodes 103, which do not have processing capability. For clarity, only one I/O node 103 is shown. Such a node 103 may be a bus converter to interface with a bus, such as a PCI bus or an S bus. Such I/O nodes 103 may function as source or destination nodes 102 as described herein. Thus, in the description herein of communicating and processing data, when a processor node 102 is described, an I/O node 103 may be also used.

Figure 2:
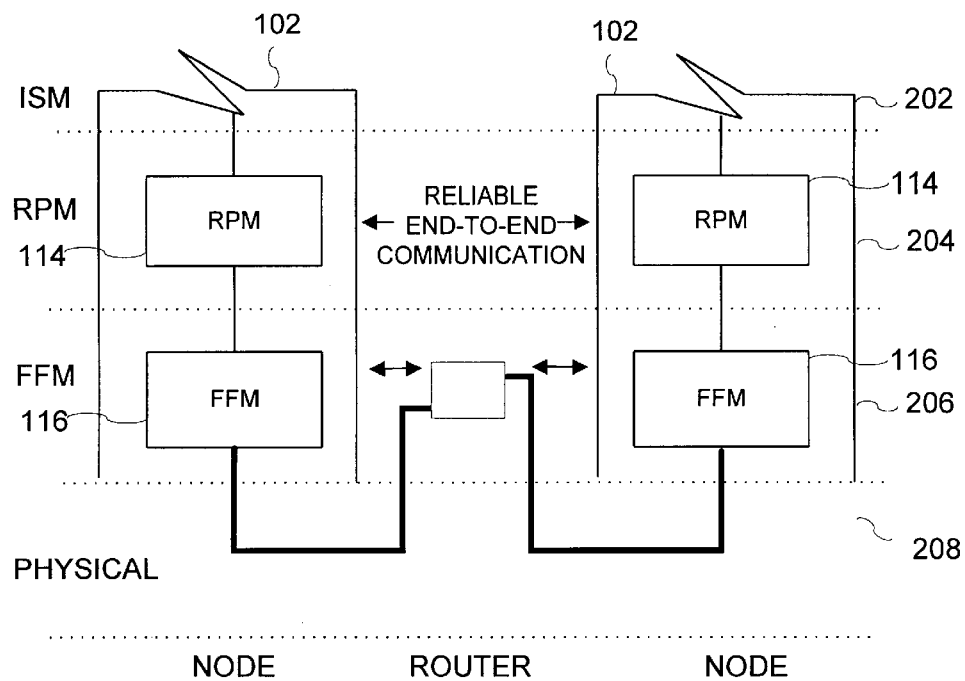
FIG. 2 is a block diagram illustrating protocol layers of the multi-processor system of FIG. 1.

Referring to FIG. 2, there is shown a block diagram illustrating the protocol layers of the processor nodes 102 and the interconnect 104. The protocol layers includes a interconnect service manager (ISM) layer 202, a reliable packet mover (RPM) layer 204, a fast frame mover (FFM) layer 206, and a physical layer 208. The coherence control unit 110 provides the functions of the interconnect service manager layer 202 which are controllable by software executed by the processor 106, the reliable packet mover layer 204, the fast frame mover layer 206, and a portion of the physical layer 208. The layers allow for a more efficient division of the functions of the system 100 and for independent development and testing of portions of the system. The interconnect service manager layer 202 communicates with point to point messages to assure coherence. When the interconnect service manager layer 202 of a first processor node 202 sends data to or requests data from another processor node 102, the interconnect service manager layer 202 of the first processor node 102 sends commands to the reliable packet mover 114 that inform the reliable packet mover 114 of the data to be sent or requested and the source or destination of the data.

At the reliable packet mover layer 204, the source processor node 102 sends data to a destination processor node 102 and does not determine the path through the interconnect 104 or use any information regarding the path. The reliable packet mover layer 204 provides reliable delivery of packets 302 (see FIG. 3) between the processor nodes 102 by using the fast frame mover layer 206 to communicate packets 302. The reliable packet mover layer 204 provides end-to-end data integrity. At the reliable packet mover layer 204, the reliable packet mover 114 sends data and monitors for an acknowledgment signal indicating that the data was received. If it is not acknowledged within a time out period, the reliable packet mover 114 resends the data. This preferably is hardware implemented, not software implemented. Thus, the reliable packet mover layer 204 resends data that is lost or corrupted during transmission. The reliable packet mover layer 204 suppresses duplicate packets and reorders data packets that are received out of order. The reliable packet mover layer 204 provides node-to-node flow control to avoid overrunning a transmit packet buffer 1106 (FIG. 11) of the destination processor node 102. At the reliable packet mover layer 204, communication is processor node 102 to processor node 102 and is not multicast or broadcast. If a packet 302 is being sent to more than one processor node 102, the interconnect service manager layer 202 sends separate copies of the packet 302 to each destination processor node 102.

At the fast frame mover layer 206, the communication is point to point communication between directly connected elements (e.g., processor nodes 102 and routers 118). The frames 300 (see FIG. 3) are sent from a source processor node 102 through a router 118 in the interconnect 104 to other routers 118 and then to a destination processor node 102. The fast frame mover layer 206 provides flow control on each step between neighbor elements (routers 118 and processor nodes 102). The fast frame mover layer 206 also provides the route to connect these steps together thereby transmitting frames from one node to another. The fast frame mover layer 206 performs simple integrity checking on only the portion of the frame 300 that is uses but no error correction. If an error occurs, the fast frame mover layer 206 discards the frame 300, and, at a later time, the sender resends the data. The fast frame mover layer 206 provides mesh link flow control to avoid overrun of the direct neighbors connected to the other end of the mesh link 120. The fast frame mover layer 206 is stream-lined for low latency by not performing error detection for each frame 300 and by dropping bad frames 300.

The physical layer 208 includes the cabling, connectors, and the like of the interconnect 104 and the interface to the processor nodes 102.

Figure 3:
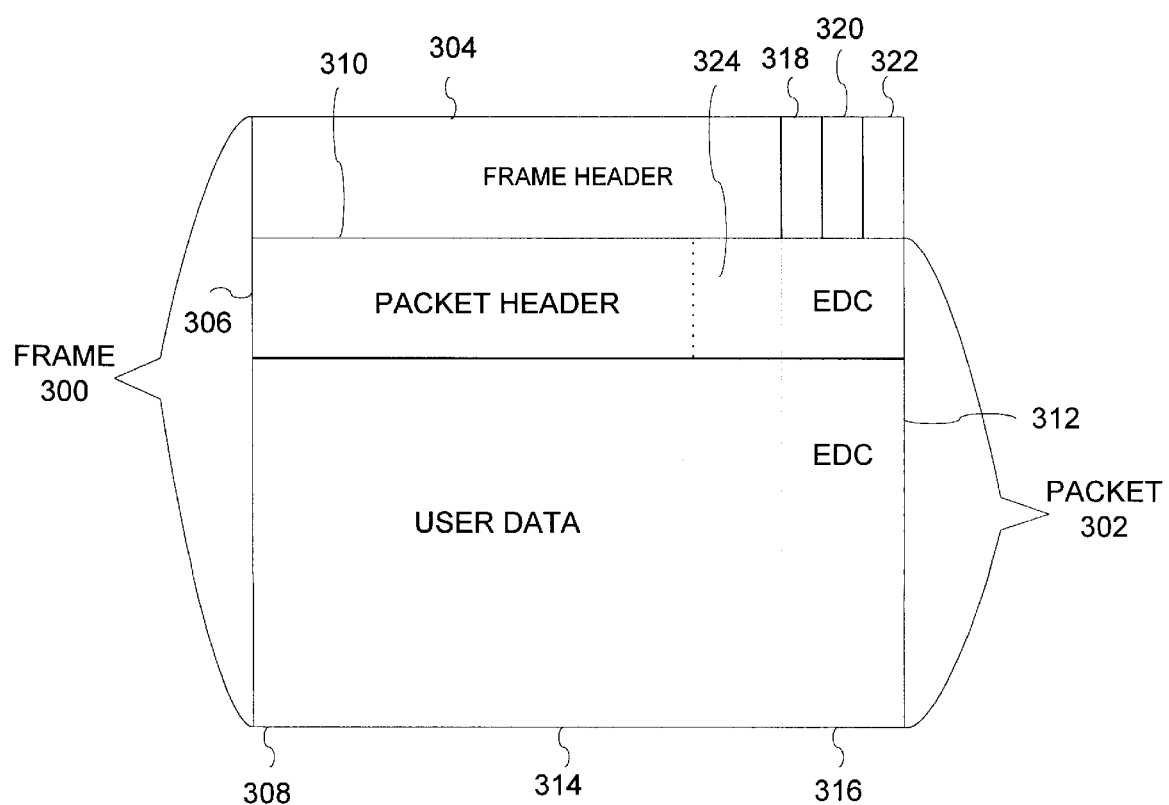
FIG. 3 is a pictorial diagram illustrating a frame and a packet.

Referring to FIG. 3, there is shown a diagram illustrating a frame 300 and a packet 302. A frame 300 is a unit of data transfer used by the fast frame mover 116. The frame 300 includes a frame header 304 and a packet 302, which is a frame body. The frame header 304 includes routing information 318, flow control information 320, and priority information 322. The routing information 318 includes a sequence of the routers 118 that are to process the frame and control the routing thereof. The flow control information 320 includes information regarding the capacity of the next down stream routers 118 or processor nodes 102 and enables controlling or halting flow of data. The priority information 322 includes a priority level of the frame 300. The frame header 304 is preferably one 68-bit word in size (8½ bytes). The frame body (packet 302) preferably is 2 to 18 (68-bit) words in size.

The packet 302 includes a packet header 306 and packet data 308. The packet header 306 includes packet header descriptors 310, a priority acknowledgment request 324, and error detection code (EDC) 312. The packet header 306 is preferably two 68-bit each word being 64-bits (8 bytes) of data and 4-bits of EDC. A packet 302 may have no packet data 308. The packet data 308 is of variable length, preferably 0 to 128 bytes of data (0 to 16 words). For example, an acknowledgment packet (described below) may include only a packet header 306 and EDC 312. The packet data 308 may be data. The packet header descriptors 310 include information indicating the destination processor node 102. As described below in conjunction with FIG. 12, the reliable packet mover 114 adds the EDC 312 to the packet 302 when the reliable packet mover 114 processes the packet 302. The EDC 312 preferably is a byte (8 bits) for every 16 bytes of the packet data 308. The EDC 312 is stored as 4 bits for each 8 bytes of the packet data 308 and is checked 8 bits per 16 bytes or 2 words at a time. The priority acknowledgment request 324 is a request to the destination processor node 102 to send an immediate acknowledgment that the packet 302 has been received.

The reliable packet mover 114 generates the packet header 306 that includes the sequence number of the packet 302. The sequence number is an identifier and an indicator of the order of packets 302 sent from a source processor node 102 to a destination processor node 102. Sequence numbers are generated for each source-destination node pair. The fast frame mover 116 does not examine or modify the frame body (packet 302). The fast frame mover 116 creates the frame header 304 upon receipt of the packet 302. The routers 118, which are part of the fast frame mover layer 206, modify the frame header 304 as the frame 302 is communicated through the interconnect 104 as described below in conjunction with FIGS. 5–6. The fast frame mover 116 in the destination processor node 102 discards the frame header 304 when transferring the packet 302 to the reliable packet mover 114 of the destination processor node 102.

Figure 4:
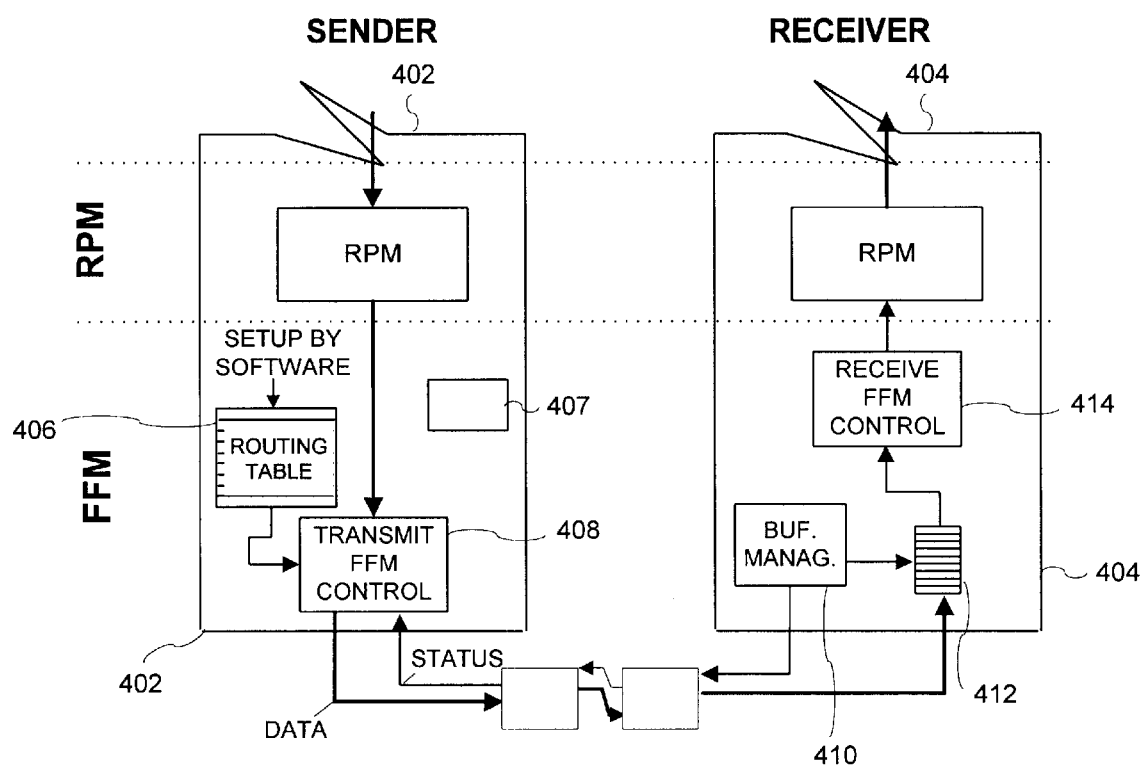
FIG. 4 is a block diagram illustrating the fast frame mover.

Referring to FIG. 4, there is shown a block diagram illustrating the fast frame mover 116, which includes a transmitting circuit 402 and a receiving circuit 404. Although each fast frame mover 116 includes both a transmitting circuit 402 and a receiving circuit 404, for clarity, only one transmitting circuit 402 and one receiving circuit 404 are shown. The transmitting circuit 402 includes a routing table 406, a random number generator 407, and a FFM transmit controller 408. The receiving circuit 404 includes a buffer manager 410, a buffer 412, and a FFM receiver controller 414. The routing table 406 stores at least one route through the interconnect 104 to each destination processor node 102. As the frame 300 is communicated along the route, each router 118 in the route modifies the frame header 304 by removing a routing step from the route.

The fast frame mover 114 and the routers 118 maintain flow control over the mesh links 120. The buffer manager 410 of the receiving circuit 404 monitors the status of the buffer 412 and sends status information over the mesh link 120 to the next upstream neighbor which can be either a router 118 or a processor node 102. Likewise, each router 118 monitors the status of buffers (not shown) therein and sends status information over the mesh link 120 to the next upstream neighbor, which can be, as above, either a router 118 or a processor node 102. The fast frame mover 114 of the source processor node 102 or the router may then slow or stop sending frames 300 to the next downstream neighbor (either a processor node 102 or a router 118) until space in the buffer 412 is available. One such implementation of flow control is described in U.S. patent application Ser. No. 08/603,913 entitled "A FLOW CONTROL PROTOCOL SYSTEM AND METHOD", filed on Feb. 22, 1996, the subject matter of which is incorporated herein by reference.

The routers 118 perform error detection to the extent that allows the router 118 to operate. For example, the router 118 determines whether the next link in the router 118 exists. For example, if the router 118 has six ports and the frame header 304 indicates that the frame 300 is to be provided to a non existent port, such as port 0, the router 118 discards the frame 300.

Figure 5:
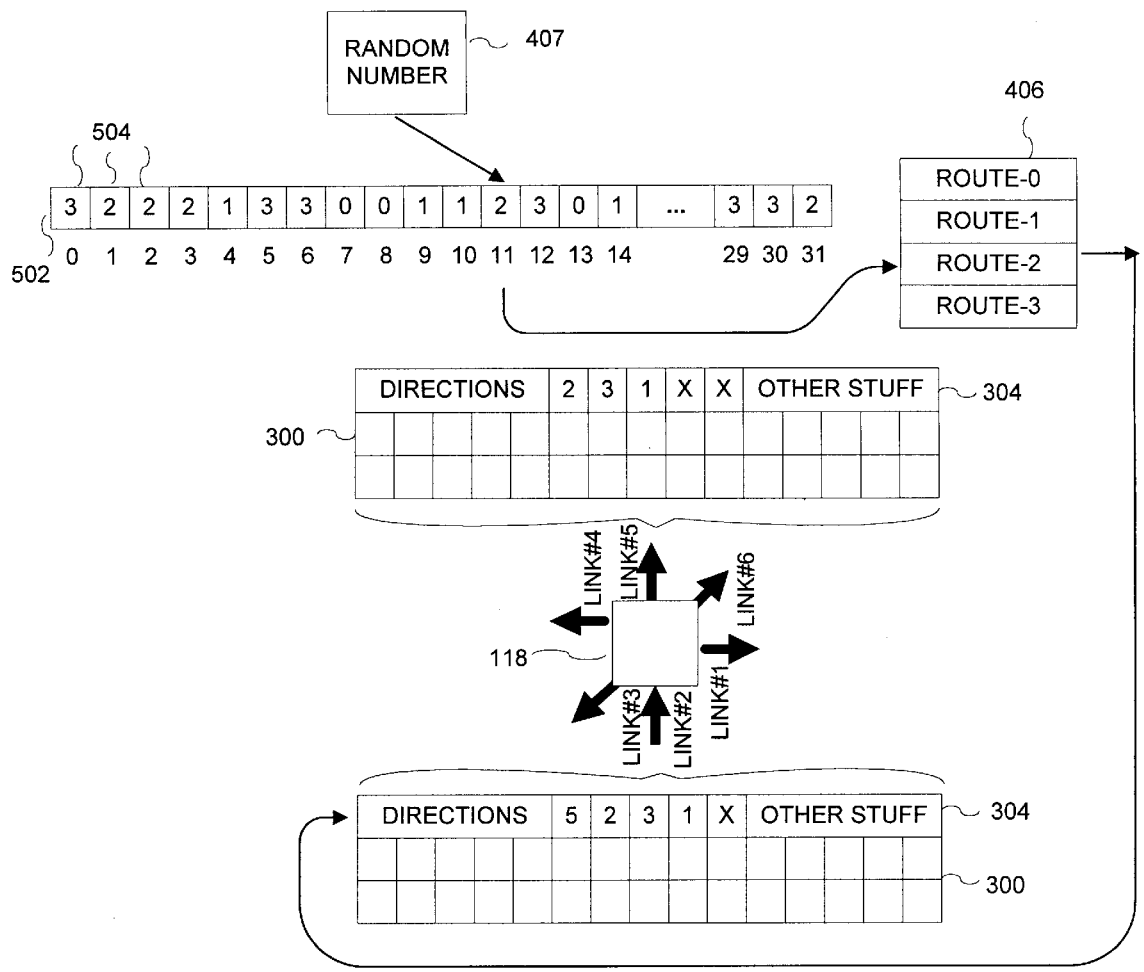
FIG. 5 is a block diagram illustrating the selection of a route of a frame.
Figure 6:
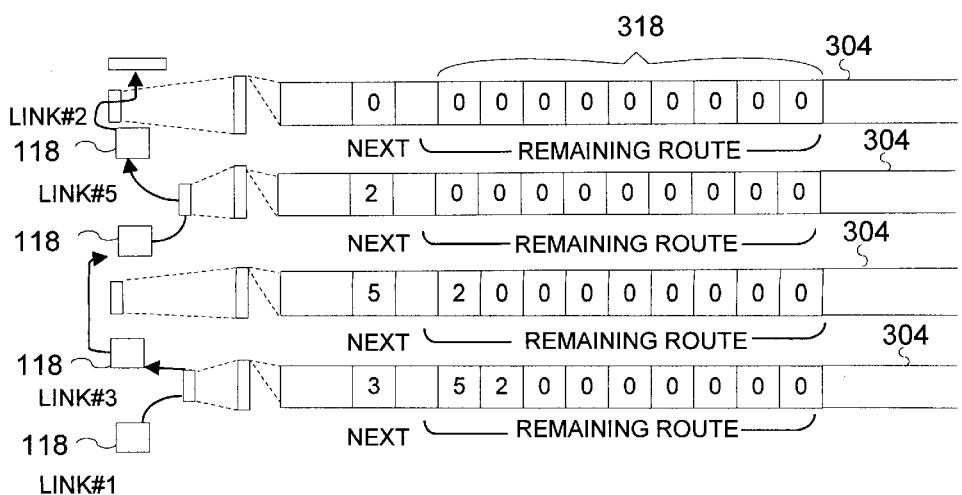
FIG. 6 is shown a block diagram illustrating the modification of routing information in the frame header while the frame is being communicated through the interconnect.

Referring to FIG. 5, there is shown a block diagram illustrating the selection of a route of a frame 300. Referring to FIG. 6, there is shown a block diagram illustrating the modification of the routing information 318 in the frame header 304 while the frame 300 is being communicated through the interconnect 104. The choice of the route depends only on the source processor node 102 and the destination processor node 102 and a random number to pick one of a plurality of routes. The route preferably is not based on the size or type of the frame 300.

The route through the interconnect 104 is deterministic. The choice of route is selected from the routing table 406, which stores a table of predetermined routes. Once the route is selected and the frame 300 is provided to the interconnect 104, the path is predetermined. The frame 300 follows this route to the destination processor node 102 or is discarded during the route in case of an error. Deterministic routing provides several advantages. First, the routers 118 can quickly process the frame 300, because the frame 300 defines the immediate destination of the frame 300 without any determination by the router 118. Second, the lifetime of the frame 300 within the interconnect 104 is bounded. The frame 300 is communicated by the pre-selected route, which is of finite length. This allows the reliable packet mover 114 to use finite length sequence numbers, which reduces the size of the packet header 306. In most cases, this also eliminates stale packets 302 from the interconnect 104. Third, the pre-selected route may follow any path through the interconnect 104. The loading of the interconnect 104 may be distributed as appropriate.

The route includes a sequence of directly coupled routers 118 between the source processor node 102 and the destination processor node 102. The route does not require a particular topology. In fact, any topology may be used in which the link between two directly coupled routers 118 is uniquely defined.

Referring specifically to FIGS. 5–6, the fast frame mover 116 receives a packet 302 from the reliable packet mover 114 that is to be sent to a pre-specified destination node, say processor node B for example, which is indicated in the packet 302. The fast frame mover 116 retrieves a random number from the random number generator 407. The fast frame mover 116 uses this random number to select one of a plurality of memory locations 504 in a probability distribution table 502. Each memory location 504 stores one of a plurality of pre-specified routes from the source processor node 102 (e.g., node A) to the destination processor node 102 (e.g., node B). The fast frame mover 116 then extracts from the selected memory location 504 the pre-specified route stored therein. The probability distribution table 502 preferably is made according to a pre-specified probability distribution which biases the route selection. For example, the fast frame mover 116 may generate the probability distribution by storing in each of a predetermined number of memory locations 504 one of the routes stored in the routing table 406. The probability distribution 502 is determined by the frequency that each of the routes is stored in the memory locations 504. The fast frame mover 116 creates a frame header 304 that includes such selected pre-specified route and prepends this frame header 304 to the packet 302 to generate a frame 300.

Refer now specifically to FIG. 6. As described above, the frame header 304 includes the routing information 318 which specifies the predetermined path from the source processor node 102 through the interconnect 104 to the destination processor node 102. As noted above, a route includes a series of route steps. Each route step defines the port of a router 118 from which the router 118 sends the frame 300. Each route step can be variable in size. For example, for a six port router 118, three bits define the port. In a 12 port router 118, four bits define the port. Accordingly, one route may includes routers 118 of various sizes. Of course, the routes may include different numbers of route steps. In this instance, the route includes route steps of different sizes. In FIG. 6, at link 1, the routing path is link 3, link 5, link 2, and the destination processor node 102. Each link in the routing path removes the code for the next link from the frame header 304, shifts the routing path in the frame header 304, and back fills the frame header 304 with a non existent processor node number, say 0. The link then provides the frame 300, which has a modified frame header 304, to the next link. For example, link #3 provides the frame 300 through port 5 and removes link 5 from the frame header 304. Of course, the last link in the route provides the frame 300 to the destination processor node 102.

Figure 7:
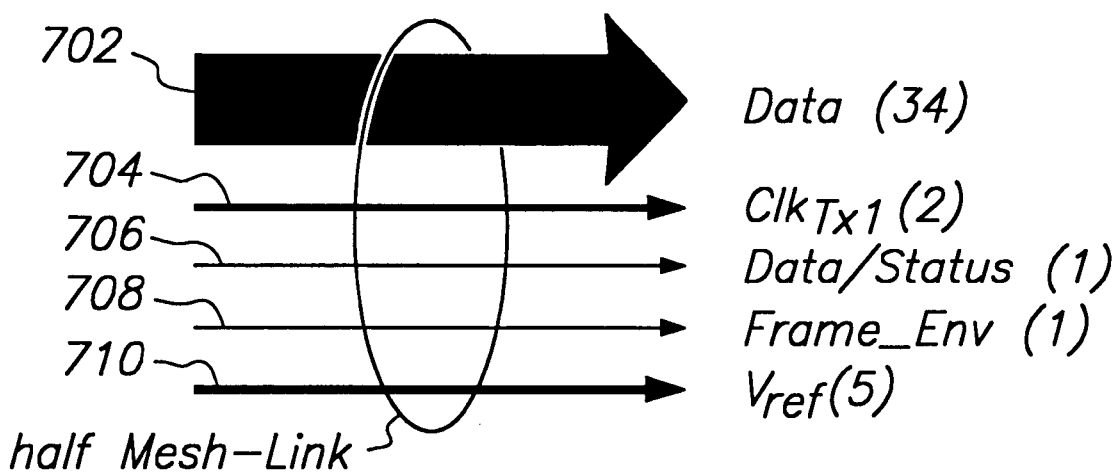
FIG. 7 is a diagram illustrating a half mesh link.

Referring to FIG. 7, there is shown a diagram illustrating a half of a mesh-link 120. A mesh link 120 includes a pair of unidirectional data paths. This pair provides a greater bandwidth than a shared media switched from sending to receiving and eliminates dependency on propagation delay, which occurs for such a shared media. For high speed systems multiple bits of information may be on the mesh link 120 at a time. The pair provides the ability for a router 118 to communicate in both directions simultaneously. The mesh link 120 provides point to point electrical connection. The mesh link 120 preferably is not a bus. Each uni-directional data path is a half mesh-link including data lines 702 and control lines, in particular, a clock line 704, a data/status indication line 706, a frame envelope line 708, and voltage reference lines 710. The data lines 702 provide a path for communicating frames 300. Buffer status information is multiplexed on the same data lines 702 when no frame 300 is sent. The bandwidth of the interconnect 104 depends on the number of data lines 702. The data lines 702 preferably are 34 lines for communicating one half of a word of the frame 300 per clock edge. The clock line 704 provides a communication path for the clock of the processor node 102 that is providing the frame 300 through the interconnect 104. The clock line 704 preferably is a full differential single clock on two lines. The data/status indication line 706 provides a signal indicative of whether the signal on the data lines 702 is data or status. For example, for flow control of the mesh link 120 as described above in conjunction with FIG. 4, the data/status indication line 706 indicates status information of the buffer 412 is being communicated over the data lines 702. The data/status indication line 706 preferably has a single line. The frame envelope line 708 provides a frame envelope signal indicative of the beginning of the frame. In particular, the frame envelope signal indicates the beginning of the frame header 304 and stays active during the transmission of the frame. The frame envelope signal becomes inactive at the end of the frame or a sufficient time before the end to allow frames to be transmitted back to back. The frame envelope line 708 preferably has a single line. The voltage reference lines 710 provides a voltage reference to the router 118 or a processor node 102, to allow small signal swings on all data and control lines 702, 706, 708, which may be single-wire differential. The voltage reference line 710 preferably is 5 lines. Each mesh link 120 preferably has 43 lines in each direction, or a total of 86 lines. This allows 34 bit to be transmitted in parallel over the mesh link 120. A word thus is transferred in two transfer cycles, equal to one clock cycle latched at both edges.

Figure 8:
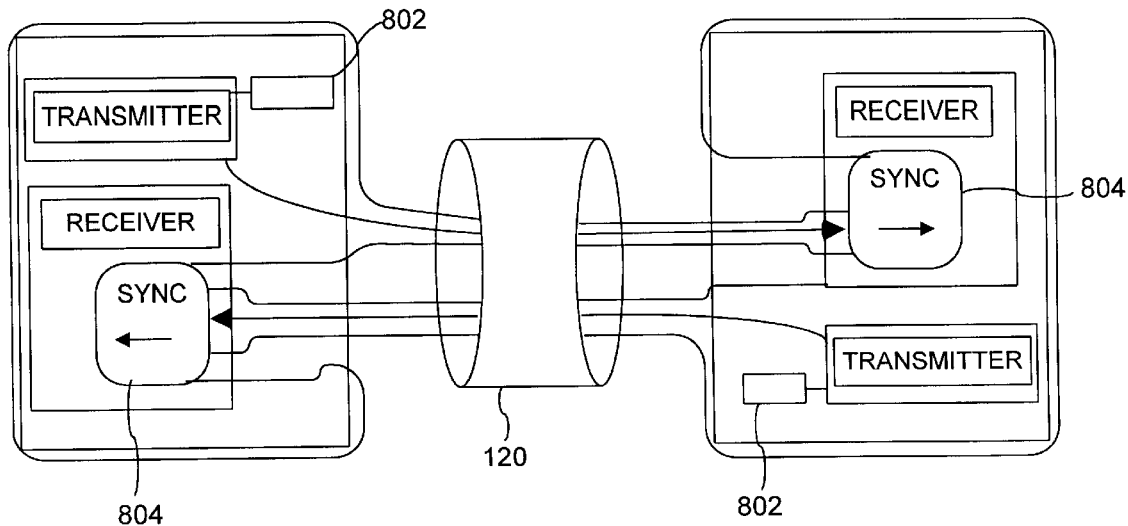
FIG. 8 is a block diagram illustrating different clock domains for a pair of receivers and transmitters of a mesh link.

Referring to FIG. 8, there is shown a block diagram illustrating different clock domains for a pair of receivers and transmitters of a mesh link 102. Each processor node 102 and each router 118 has an internal clock generator 802 for providing a clock signal. The clock generators 802 preferably provide clock signals that are substantially equal. The clock is provided on the mesh link 120 to the next neighbor (either the destination processor node 102 or a router 118), which uses this clock to accept the data. More specifically, this clock is used to latch the data into a First-In-First-Out (FIFO) buffer 804 in the destination processor node 102 or in the router 118. The destination processor node 102 or the router 118 uses its own internal clock generator 802 to read the data from the FIFO buffer 804. This allows the destination processor node 102 or the router 118 to accept data that is based on a clock that has a frequency drift and a phase shift from the clock of the destination processor node 102 or the router 118. This clocking eliminates the need for global synchronization of all clocks. The clock domain is a plesiosynchronous clock domain. The clock is provided on the mesh link 120 with the data on the data line 702. One example of clocking is in U.S. patent application Ser. No. 08/223,575, entitled "DATA SYNCHRONIZER SYSTEM AND METHOD", filed Apr. 6, 1994, the subject matter of which is incorporated herein by reference.

Figure 9:
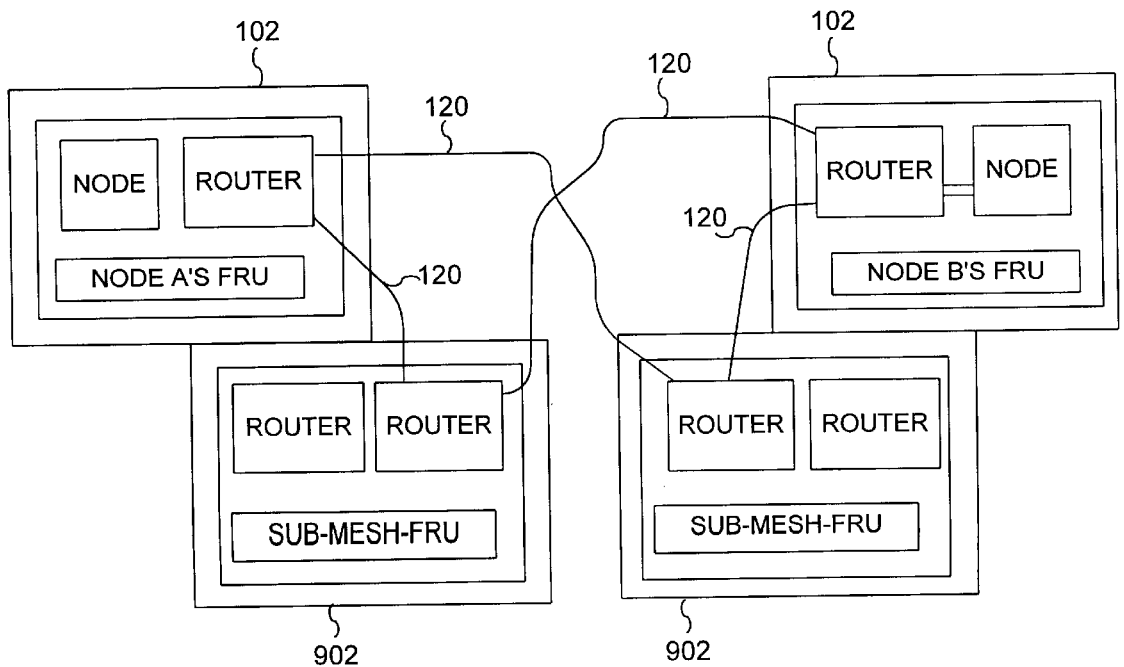
FIG. 9 is a block diagram illustrating a fault tolerant interconnect in a second embodiment of the present invention.

Referring to FIG. 9, there is shown a block diagram illustrating a fault tolerant interconnect in a second embodiment of the present invention. The interconnect 104 includes at least two sub-meshes 902 that provide redundant paths between processor nodes 102 for providing fault tolerance. The fast frame movers 116 dynamically either reroute around routers 118 or mesh links 120 that are nonfunctional or have been removed or use another sub-mesh 902.

Each sub-mesh 902 is coupled by a mesh link 120 to every processor node 102. Each sub-mesh 902 is preferably similar to a non fault tolerant mesh. Each processor node 102 is coupled by a mesh link 120 to a router 118 which is coupled by separate mesh links 120 to each of the sub-meshes 902.

Each router 118 includes a counter (not shown) that is incremented each time the router 118 discards a frame 300. Periodically the multiprocessor system 100 reads the counter to determine whether the router 118 or mesh links 120 connected to it are likely to have a defect. If such a determination is made, the multiprocessor system 100 eliminate the router 118 or the sub-mesh 902 in a fault redundant system from the predetermined routes. For instance, the processing node 102 may delete this route from the probability distribution table 502 for selecting routes from the routing table 406. A processor node 102 may count the number of retransmissions of a packet 302 that are required for each destination processor node 102 and if the count is above a predetermined threshold, determine whether a router 118 in the path has a high defect count.

Figure 10:
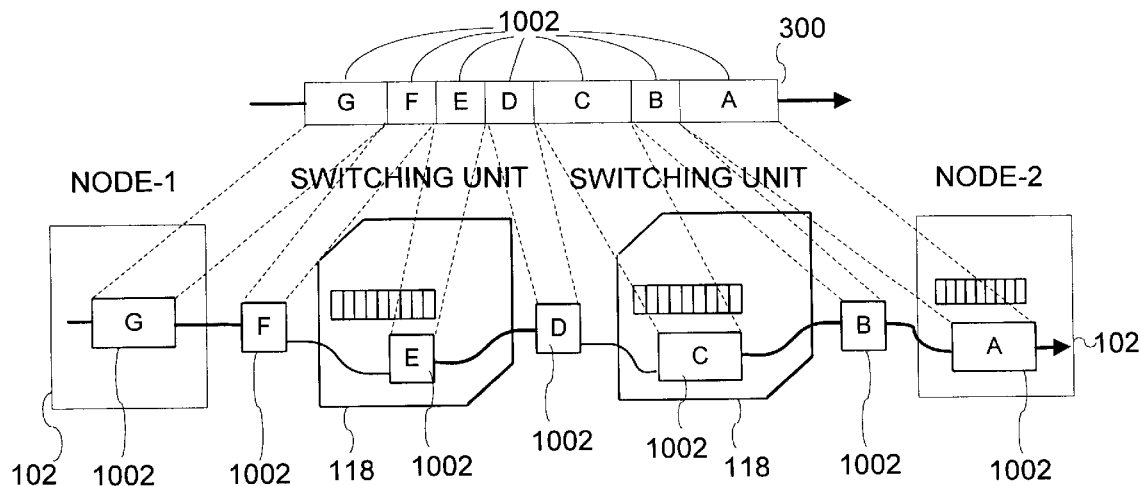
FIG. 10 is a block diagram illustrating virtual cut-through routing.

Referring to FIG. 10, there is shown a block diagram illustrating virtual cut-through routing in which the beginning of a frame 300 may be sent to the next router 118 or processor node 102 in the route even if the end of the frame 300 has not been received yet. More specifically, a packet 302 is partitioned into a plurality of segments 1002 say 7 for example. The segments 1002 preferably are different sized. As described above, the source processor node 102 selects the route for sending the packet to the destination processor node 102. The source processor node 102 provides the frame 300 to the first router 118 in the route. Upon receipt of the frame header 306, the first router 118 in the route determines the next mesh link 120 to send the frame 300 and starts sending the frame 300 if the recipient has buffer resources available and the output port is available. The frame 300 may span many routers 118 and mesh links 120, including the destination processor node 102. As shown in FIG. 10, the first segment 1002 of the frame 300 has been received at the destination processor node 102 and the second through sixth segments 1002 are at different routers 118 and mesh links 120 in the route. The source processor node 102 has not yet sent the seventh segment 1002. The latency of the virtual cut-through routing typically does not include buffering in the intermediate routers 118. In contrast, in store-and-forward routing, the entire message is stored before forwarding. In such routing, the latency includes the buffering.

Figure 11:
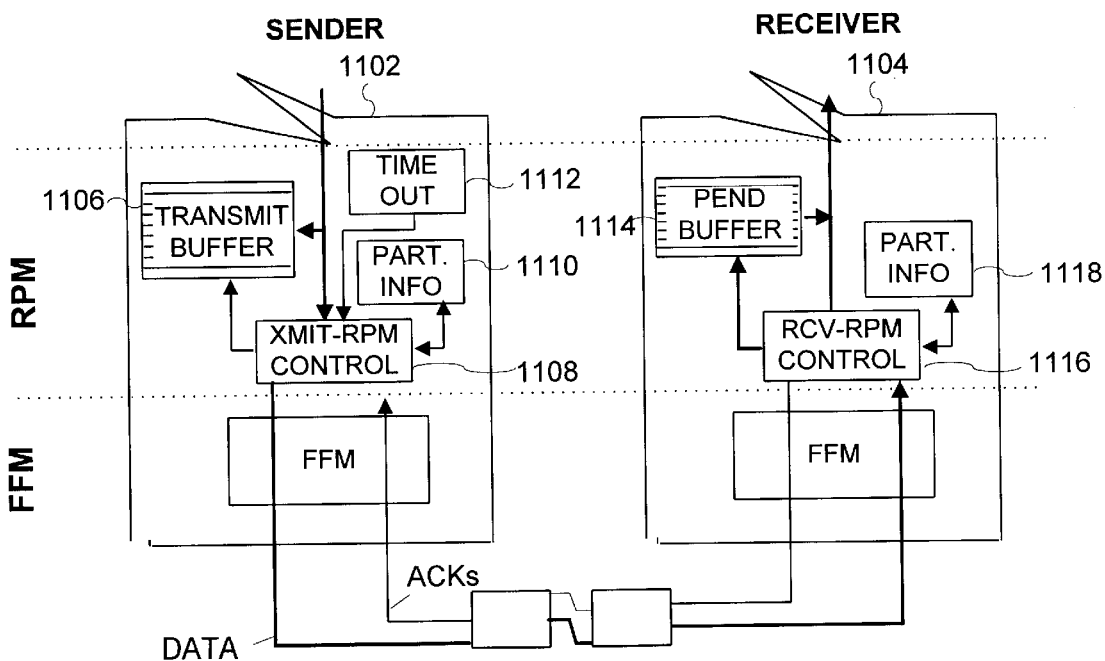
FIG. 11 is a block diagram illustrating a reliable packet mover of the multiprocessor system of FIG. 1.

Referring to FIG. 11, there is shown a block diagram illustrating a reliable packet mover 114, which includes a transmitting circuit 1102 and a receiving circuit 1104. Although each reliable packet mover 114 includes both a transmitting circuit 1102 and a receiving circuit 1104, for clarity, only one transmitting circuit 1102 and one receiving circuit 1104 are shown. The transmitting circuit 1102 includes a transmit packet buffer 1106, a RPM transmit controller 1108, a partner information table 1110, and a time out circuit 1112 for controlling the retransmission of lost or corrupted data. The transmit packet buffer 1106 stores the packets 302 that have been transmitted but not acknowledged. The transmit packet buffer 1106 is smaller in size than in software implemented systems because the smaller latency in the system 100, in combination with virtual cut through routing, makes out-of-order reception of packets 302 less common and because the interconnect service manager layer 202 holds packets 302 if the transmit packet buffer 1106 is full. The partner information table 1110 stores, for each destination processor node 102, the sequence number of the next packet 302 that is to be sent, and that is expected to be acknowledged from that destination processor node 102. The RPM transmit controller 1108 controls the operation of the transmitting circuit 1102. The time out circuit 1112 provides a time count for controlling the retransmission of lost or corrupted data.

The receiving circuit 1104 includes a pending packet buffer 1114, a RPM receiver controller 1116, and a partner information table 1118. The pending packet buffer 1114 stores packets 302 that have been received out of sequence. The pending packet buffer 1114 is smaller in size than in software implemented systems because the smaller latency in the system 100 makes out-of-order reception of packets 302 less common. The RPM receiver controller 1116 controls the operation of the receiving circuit 1104. The partner information tablet 1118 stores, for each source processor node 102, the sequence number of the next expected packet 302 from that source processor node 102.

The reliable packet mover 114 generates the packet header 306 that includes the sequence number of the packet 302. Sequence numbers are used to inform the destination processor node 102 of the sequence of the packets 302. The destination node only processes the packets 302 in sequence. Upon receipt of an in order packet 302, the destination processor node sends an acknowledgment back to the source processor node 102 informing same of the receipt of the packet 302. If the source processor node 102 does not get an acknowledgment within a predetermined time, the source processor node 102 retransmits the packet 302 using the same sequence number.

Figure 12A:
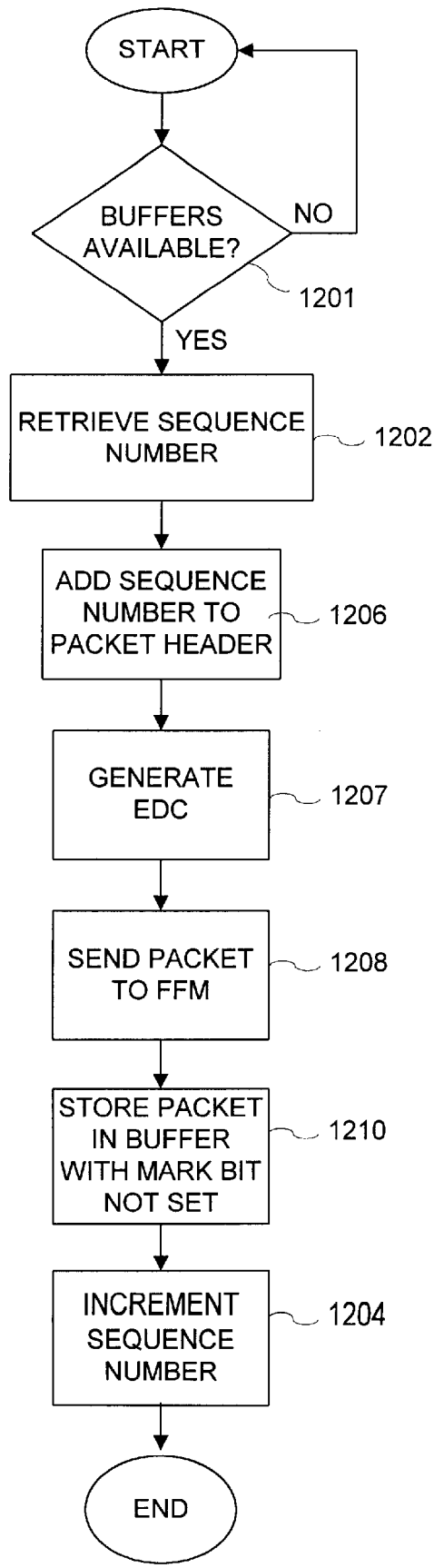
FIG. 12a is a flowchart illustrating the operation of the transmitting packets by the reliable packet mover.

Referring to FIG. 12a, there is shown a flowchart illustrating the operation of the transmitting circuit 1102 of the reliable packet mover 114. To transmit data, the coherence control unit 110 provides the data and an identification of the destination processor node 102 to the reliable packet mover 114, which converts the data into packets 302 and assigns a sequence number to each packet 302. Each transmitted packet 302 is stored in the transmit packet buffer 1106 in the source processor node 102. If 1201 it has capacity, the transmit packet buffer 1106 accepts the data and the reliable packet mover 114 transmits the packet 302. If not, the interconnect service manager layer 202 stops sending packets 302 and waits.

When the reliable packet mover 114 is to transmit a packet 302, the transmitting circuit 1102 retrieves 1202 a sequence number from the partner information table 1110 corresponding to the destination processor node 102. The transmitting circuit 1102 adds 1206 the retrieved sequence number to the packet header 306 of the packet 302 and performs 1207 an error detection. The transmitting circuit 1102 sends 1208 the packet 302 to the fast frame mover 116 for transmission as described above. The transmitting circuit 1102 also stores 1210 the packet 302 in the transmit packet buffer 1106 with a mark bit for that packet 302 that is not set, until an acknowledgment is received that the packet was received. The sequence number in the partner information table 1110 is incremented 1204 for the next packet 302 transmission. Because the sequence numbers are finite, they eventually will wrap around. Accordingly, the sequence number space is sufficiently large so that no packets 302 with the same sequence number are in the system 100 at the same time.

Figure 12B:
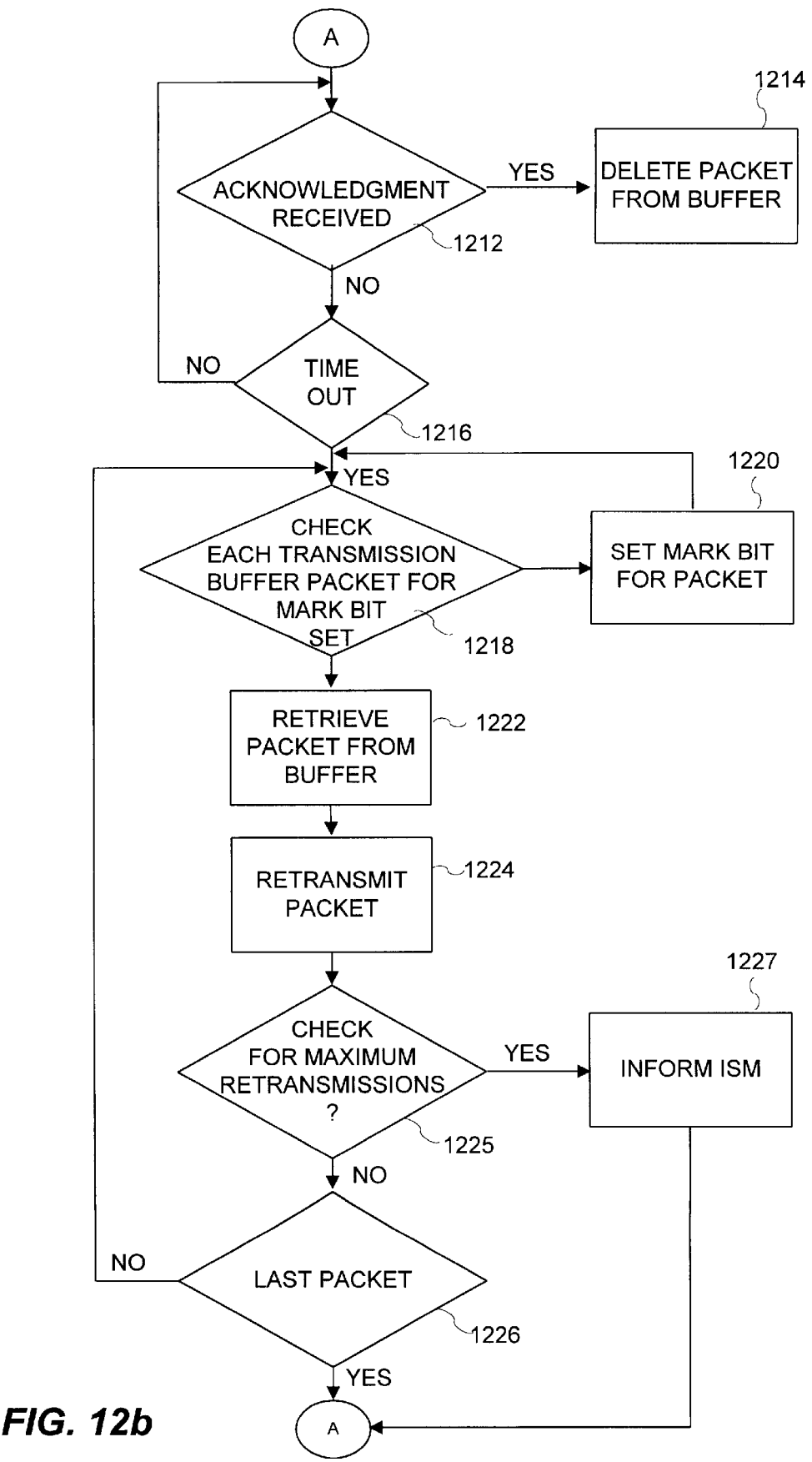
FIG. 12b is a flowchart illustrating the operation of processing acknowledgments and retransmission of packets by the reliable packet mover.

Referring to FIG. 12b, there is shown a flowchart illustrating the operation of processing acknowledgment packets and retransmission of packets by the reliable packet mover, if packets have been sent. The acknowledgment packet is a control packet from the receiving circuit 1104 to the source processor node 102 that indicates that the packet 302 was received and passed error detection. The acknowledgment packet includes a destination node number, the sequence number of the received packet 302, and EDC, preferably 16 bytes. The acknowledgment packet may be appended to another packet 302 that is being sent to the source destination node 102. This reduces traffic in the interconnect 104. The acknowledgment packet itself is not acknowledged and does not include its own sequence number. The sequence number in an acknowledgment packet implicitly acknowledges all prior packets, i.e. all packets with numbers that are less than the sequence number in the acknowledgment or adjusted because of the wrap around noted above. This allows the receiving circuit 1104 to delay the acknowledgment of packets 302 and to reduce the traffic of acknowledgment packets by using a single acknowledgment packet to acknowledge more than one packet 302.

The transmitting circuit 1102 determines 1212 whether an acknowledgment packet is received. If so, the transmitting circuit 1102 deletes 1214 the packets 302 corresponding to the received acknowledgment from the transmit packet buffer 1106. This deletion includes all prior packets 302 in the transmit packet buffer 1106 for the source-destination processor node 102 pair. These packets 302 have a sequence number less than or equal to the sequence number in the acknowledgment packet or sequence numbers that are appropriately adjusted to account for the wrap around.

The packet 302 is resent if an acknowledgment packet is not received after a specified time-out period. Specifically, if an acknowledgment packet is not received 1212, the transmitting circuit 1102 determines 1216 whether the time out circuit 1112 has timed out. If not, the transmitting circuit 1102 continues to determine 1212 whether an acknowledgment is received.

On the other hand, if the time out circuit 1112 has timed out, the transmitting circuit 1102 checks 1218 each packet 302 stored in the transmit packet buffer 1106 to determine if a mark bit is set for that packet 302. If the bit is not set, the transmitting circuit 1102 sets 1220 the mark bit for that packet 302. This allows a packet 302 between one or two time out periods before being resent. For packets 302 with the mark bit set 1218, the transmitting circuit 1102 retrieves 1222 the packet 302 from the transmit packet buffer 1106 and retransmits 1224 the packet 302. To determine that the interconnect 104 is defective, a limited or maximum number of retransmissions are sent. In particular, the transmitting circuit 1102 determines 1225 if the packet 302 has been resent a predetermined number of times. If it has been, the transmitting circuit 1102 informs 1227 the interconnect service manager layer 202 of such number of retransmissions and the layer 202 then may reroute packets 302 between that source-destination node pair. If the number of retransmissions has not reached the maximum, then upon reaching 1226 the last packet 302, the transmitting circuit 1102 continues to determine 1212 whether an acknowledgment packet is received as described above.

Figure 13:
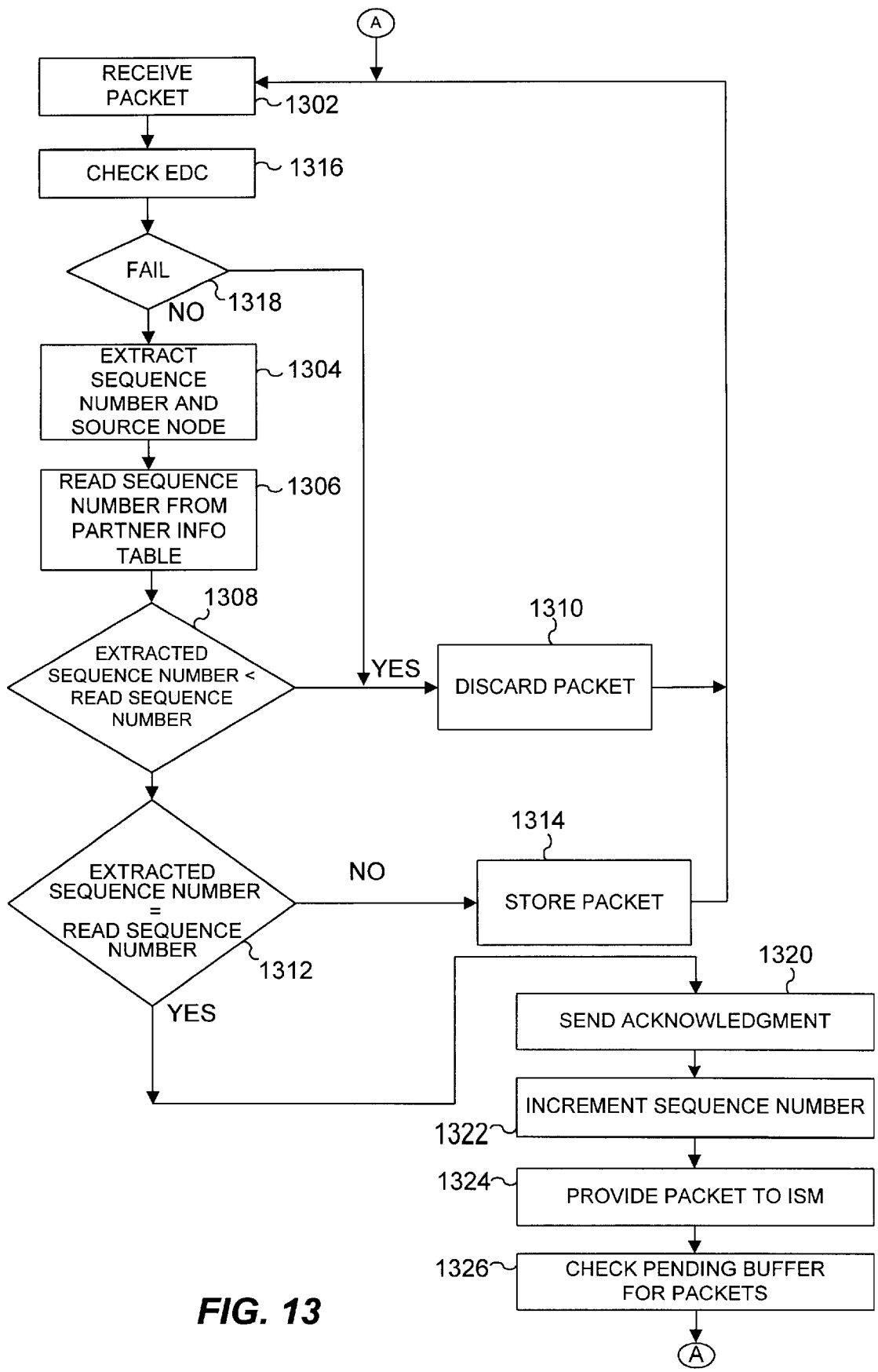
FIG. 13 is a flowchart illustrating the operation of receiving packets by the reliable packet mover.

Referring to FIG. 13, there is shown a flowchart illustrating the operation of the receiving circuit 1104 of the reliable packet mover 114. The receiving circuit 1104 of the reliable packet mover 114 provides the packet 302 to the interconnect service manager layer 202 by sequence number order. The receiving circuit 1104 receives 1302 a packet 302 from the interconnect 104. If the pending packet buffer 1114 is full, the receiving circuit 1104 discards the packet 302. Alternatively, the receiving circuit 1104 may discard the latest packet 302 stored in the pending packet buffer 1114. Of course other packets 302 may be discarded from the pending packet buffer 1114 since this addresses performance and not correctness. The receiving circuit 1104 performs 1316 error detection on the packet 302. If the packet 302 fails 1318 error detection, the packet 302 is discarded 1310 and the receiving circuit 1104 continues to receive 1302 packets 302. On the other hand if the packet 302 does not fail 1318 error detection. Then the receiving circuit 1104 extracts 1304 the sequence number and source node number from the packet header 306. The receiving circuit 1104 reads 1306 the next expected sequence number for the source processor node from the partner information table 1118, and compares 1308 the next expected sequence number to the extracted sequence number. If the extracted sequence number is less than the expected sequence number, the packet 302 already has been processed by the receiving circuit 1104 and is a duplicate. Again the wrap around of sequence numbers is appropriately accounted for. The packet 302 is discarded 1310 and the receiving circuit 1104 continues to receive 1302 packets 302.

If the extracted sequence number is not less than the expected sequence number, the receiving circuit 1310 determines 1312 whether the extracted sequence number is equal to the expected sequence number. If there is not a match, the received packet 302 is out of sequence. The receiving circuit 1104 stores 1314 the packet 302 in the pending packet buffer 1114 and the receiving circuit 1104 continues to receive 1302 packets 302.

On the other hand, if the next expected sequence number matches 1312 the extracted sequence number, the receiving circuit 1104 provides 1320 an acknowledgment to the interconnect 104. Because the received packet 302 is the expected packet 302, the receiving circuit 1104 increments 1322 the partner information table 1118 for the corresponding source processor node. The receiving circuit 1104 provides 1324 the packet 302 to the interconnect service manager layer 202 for processing and checks 1326 the pending packet buffer 1114 for the packet 302 next in the sequence.

Figure 14:
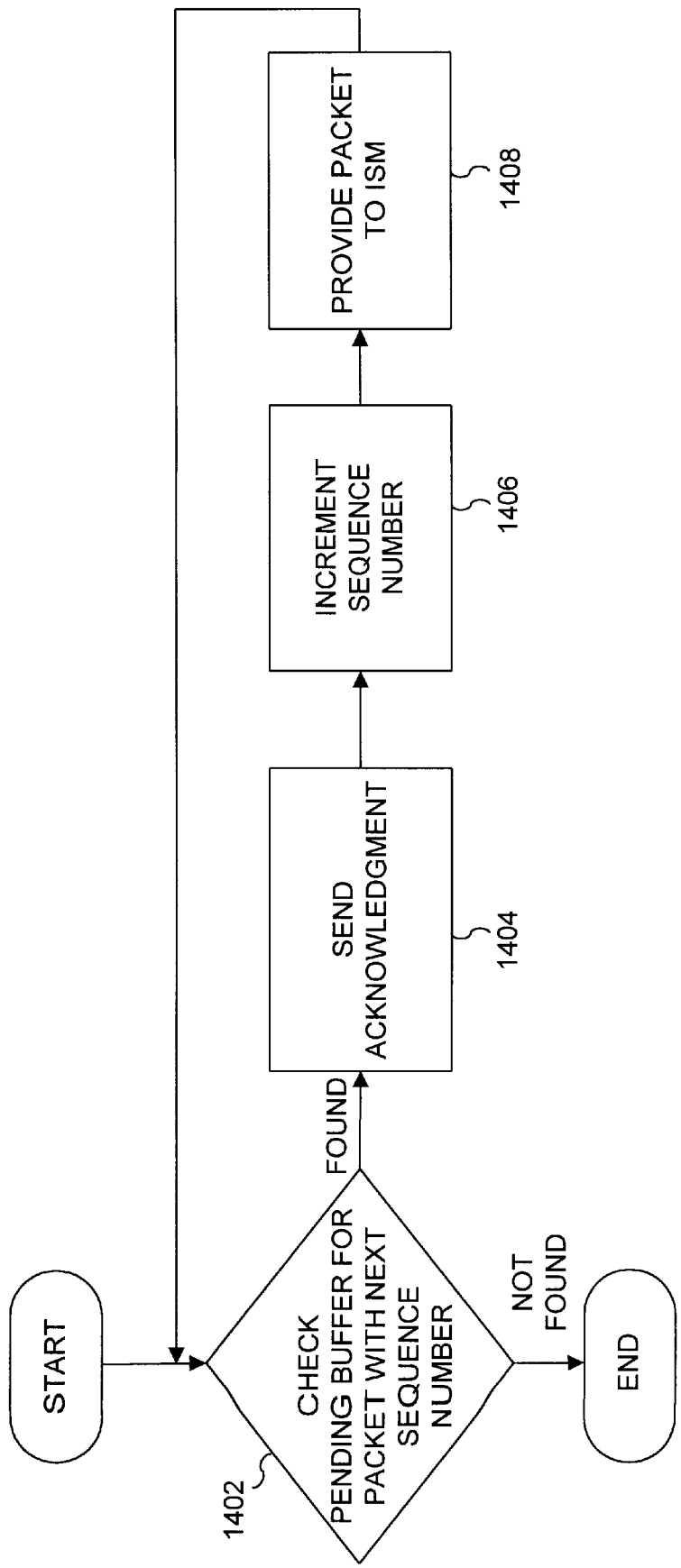
FIG. 14 is a flowchart illustrating the operation of checking the pending packet buffer.

Referring to FIG. 14, there is shown a flowchart illustrating the operation of checking 1326 the pending packet buffer 1114. The receiving circuit 1104 checks 1402 the pending packet buffer 1114 for the packet 302 next in the sequence. If the next expected packet 302 is in the pending packet buffer 1114, the receiving circuit 1104 also sends 1104 an acknowledgment and increments 1406 the sequence number. The receiving circuit 1104 provides 1408 that packet 302 to the interconnect service manager layer 202. The receiving circuit 1104 continues checking the pending packet buffer 1114 for the next expected packet 302 until such packet 302 is not found. The receiving circuit 1104 continues to monitor 1302 (FIG. 13) for received packets 302.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

We claim:

1. A system for communicating data in packets, each packet included in a frame, the system comprising:
    a plurality of routers disposed to transmit and receive frames among one another; and
    a plurality of nodes, each node including a frame mover disposed to transmit frames to and receive frames from the routers and including a packet mover disposed to supply packets to and receive packets from the frame mover, the packet mover of one of the nodes supplying a packet to the frame mover of said one of the nodes, with the packet indicating a destination node among the plurality of nodes, the frame mover of said one of the nodes, selecting a predetermined route through the routers to the destination node, including the packet and the route in the frame, and transmitting the frame to the routers;
    the routers transmitting the frame to the frame mover of the destination node in response to the route included in the frame;
    the frame mover of the destination node receiving the frame and supplying the packet included therein to the packet mover of the destination node, the packet mover of the destination node checking the packet for errors, discarding the packet in response to detecting an error, and transmitting an acknowledgment for the packet to said one of the nodes in response to detecting no errors; and
    the packet mover of said one of the nodes retransmitting the packet to the destination node in response to receiving no acknowledgment for the packet within a predetermined period of time.

2. A system for transmitting data in packets, each packet include in a frame, the system comprising:
    a plurality of mesh links each for carrying frames during transmission;
    a plurality of routers linked in a network by the mesh links which carry frames between the routers; and
    a plurality of nodes each linked to the plurality of routers by at least one of the mesh links, one of the nodes being a source node for selecting a predetermined route to another of the nodes being a destination node, the predetermined route from a routing table having a plurality of predetermined routes to the destination node, with said predetermined route indicating a sequence of the mesh linking said one of the nodes to said another of the nodes, generating a frame that includes said predetermined route and a packet, and transmitting the frame along the mesh line includes said beginning the sequence to one of the routers, each router linked by the sequence transmitting the frame along the sequence to said another of the nodes in response to the route included in the frame, said another of the nodes extracting the packet from the frame, checking the packet for errors, and processing the packet in response to detecting no errors.

3. The system of claim 2, wherein the nodes include:
    a controller for selecting one of the plurality of predetermined routes for inclusion in the frame.

4. The system of claim 3 wherein the controller selects said one of the plurality of predetermined routes for inclusion in the frame according to a probability distribution weighting a likelihood of selection of each of the predetermined routes.

5. A method for sending data in packets between nodes of a communication system, each node having a buffer, each packet including an identifier distinguishable from identifiers of other packets in the systems, the method comprising the steps of:
    a) sending a copy of a packet including the identifier of the packet from a first node to a second node;
    b) storing the packet of step a) in the buffer of the first node;
    c) receiving an acknowledgment including a second identifier at the first node from another of the nodes;
    d) removing the packet from the buffer of the first node in response to the second identifier matching the identifier of the packet; and
    e) resending each packet in the buffer of the first node in response to not receiving the acknowledgment after a predetermined time.

6. The method of claim 5, wherein the identifier is a number and the step of removing the packet from storage includes the step of removing each packet from storage having an identifier less than or equal to the second identifier.

7. The system of claim 2, wherein each node has a identifier, and each predetermined route comprises the sequence of routers linked by the sequence of the mesh links, and further includes the identifier of said another of the nodes, for identifying the sequence of the mesh links in each predetermined route.

8. The system of claim 2, wherein:
    said one of the nodes includes the predetermined route in a beginning portion of the frame; and
    at least one of the routers linked by the sequence of the mesh links receives the beginning portion of the frame and prior to receiving an end portion of the frame transmits said beginning portion along the sequence of the mesh links to said another of the nodes in response the route included in the beginning portion of the frame.

9. The method of claim 5, wherein steps a) and b) are performed a plurality of times without performing steps c), d), and e).

10. The method of claim 5, wherein steps c), d), and e) are performed a plurality of times without performing steps a) and b).

11. A system for communicating data in packets, each packet includes a sequence number and is included in a frame, the system comprising:

a plurality of routers disposed to transmit and receive frames among one another; and a plurality of nodes, each node including a frame mover disposed to transmit frames to and receive frames from the routers and including a packet mover disposed to supply packets to and receive packets from the frame mover, each packet mover including:

a table or storing the sequence number of the next packet expected from each other packet mover;

a buffer for storing each packet received from another of the packet movers having a sequence number that follows the sequence number in the table corresponding to said another of the packet movers; and a controller for comparing the sequence number of a packet received from one of the other packet movers to the stored sequence number in the table corresponding to said one of the other packet movers, storing the packet in the buffer in response to the sequence number of the packet following said stored sequence number, processing the packet and incrementing said stored sequence number in response to the sequence number of the packet matching said stored sequence number, and removing and processing another packet stored in the buffer in response to the incremented sequence number matching the sequence number of said another packet and then again incrementing the incremented sequence number;

the packet mover of one of the nodes supplying a packet to the frame mover of said one of the nodes, with the packet indicating a destination node among the plurality of nodes, the frame mover of said one of the nodes selecting a predetermined route through the routers to the destination node, including the packet and the route in the frame, and transmitting the frame to the routers;

the routers transmitting the frame to the frame mover of the destination node in response to the route included in the frame;

the frame mover of the destination node receiving the frame and supplying the packet included therein to the packet mover of the destination node, the packet mover of the destination node checking the packet for errors, discarding the packet in response to detecting an error, and transmitting an acknowledgment for the packet to said one of the nodes in response to detecting no errors; and the packet mover of said one of the nodes retransmitting the packet to the destination node in response to receiving no acknowledgment for the packet within a predetermined period of time.

12. A method for sending data in packets between nodes of a communication system using a plurality of mark bits, each mark bit having a set state and an unset state, and each node having a buffer, and each packet including an identifier distinguishable from identifiers of other packets in the system, the method comprising:

a) sending a copy of a packet including the identifier of the packet from the first node to a second node;

b) storing the packet of step a) in the buffer of the first node, including:
associating a mark bit with the packet;
and placing the mark bit in the unset state;

c) receiving an acknowledgment including a second identifier at the first node from another of the nodes;

d) removing the packet from the buffer of the first node if the second identifier matches the identifier of the packet; and e) resending each packet in the buffer of the first node after a predetermined time, including:
resending each packet in the buffer of the first node having a mark bit in the set state; and
placing into the set state the mark bit of each packet in the buffer of the first node and having a mark bit in the unset state.

* * * * *

UNITED STATES PATENT AND TRADEMARK OFFICE
CERTIFICATE OF CORRECTION

PATENT NO. : 5,959,995

DATED: September 28, 1999

INVENTORS  Thomas M. Wicki, Patrick J. Helland, Takeshi Shimizu,
Wolf-Dietrich Weber and Winfried W. Wilcke It is certified that errors appear in the above-identified patent and that said Letters Patent is hereby corrected as shown below:

Column 13, line 61, replace "include" with --included--.

Column 14, line 9, replace "line includes said" with --link--.

Signed and Sealed this

Twenty-third Day of May, 2000

*Attest:*

Q. TODD DICKINSON

*Attesting Officer*     Director of Patents and Trademarks

UNITED STATES PATENT AND TRADEMARK OFFICE
CERTIFICATE OF CORRECTION

PATENT NO. : 5,959,995          Page 1 of 1
DATED : September 28, 1999
INVENTOR(S) : Thomas W. Wicke, Patrick J. Helland, Takeshi Shimizu, Wolf-Dietrich Weber and Winifried W. Wilke It is certified that error appears in the above-identified patent and that said Letters Patent is hereby corrected as shown below:

<u>Column 15,</u>
Line 11, replace "or" with --for--.

Signed and Sealed this

Thirty-first Day of July, 2001

*Attest:*

NICHOLAS P. GODICI
*Attesting Officer*     *Acting Director of the United States Patent and Trademark Office*